(No Model.)
W. L. SILVEY.
SECONDARY BATTERY.
No. 459,535.  Patented Sept. 15, 1891.
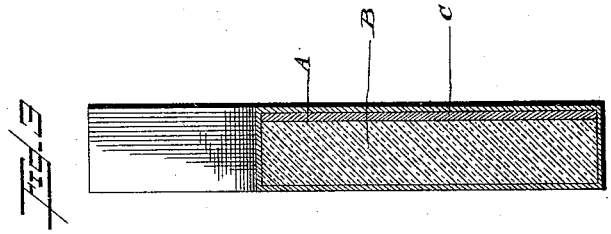
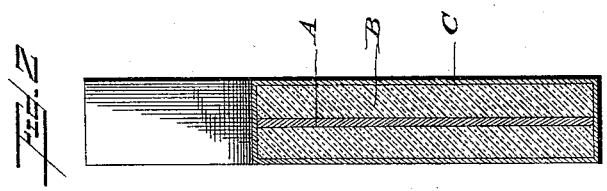
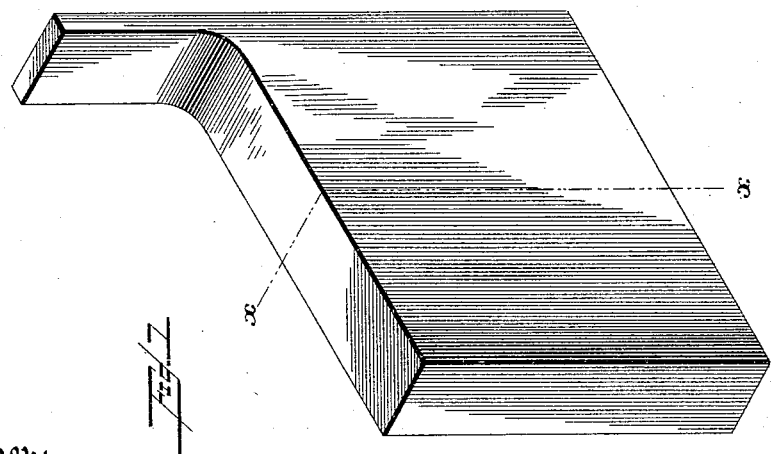
Witnesses  Inventor
  William L. Silvey
By his Attorney

UNITED STATES PATENT OFFICE.

WILLIAM L. SILVEY, OF LIMA, OHIO, ASSIGNOR TO CATHARINE P. SILVEY AND FRANK SILVEY, OF CASTLETON, INDIANA, AND MARY SILVEY, OF DAYTON, OHIO.

SECONDARY BATTERY.

SPECIFICATION forming part of Letters Patent No. 459,535, dated September 15, 1891.

Application filed June 27, 1891. Serial No. 397,725. (No model.)

*To all whom it may concern:*

Be it known that I, WILLIAM L. SILVEY, a citizen of the United States, residing in Lima, in the county of Allen and State of Ohio, have invented certain new and useful Improvements in Secondary Batteries, of which the following is a specification.

This invention relates to a process of initially preparing the electrodes of so-called "secondary" or "storage" batteries, whereby the minium or other material employed as an active agent is caused to adhere tenaciously to the support or plate upon which it is placed, and whereby the liability of any buckling of the plate or the scaling or dropping off of the active material is prevented.

The objects of the invention, broadly stated, are, first, to establish an intimate union of the active material with the support or plate previous to being formed, as opposed to such mechanical means as are commonly employed for retaining the said material in position, and, secondly, to prepare the active material against expansion or disintegration when undergoing its subsequent formation under chemical and electrical influence, as opposed to the ordinary methods of subjecting the plates to chemical and electrical influence without any preliminary preparation.

The invention consists in the process of preparing secondary-battery electrodes or plates, as will hereinafter be fully described in the specification and pointed out in the claims.

In the accompanying drawings, forming part of this specification, and in which like letters of reference indicate corresponding parts, Figure 1 is a perspective view of a complete electrode. Fig. 2 is a sectional view taken on the line $x$ $x$, showing the support coated on both sides with active material and the envelope or film for holding the said material in position. Fig. 3 is a similar view to Fig. 2, showing the support coated on but one side with the active material.

In carrying my invention into effect I first take a suitable vessel and pour into it a quantity of water, preferably aqua-distillata or rain-water, into which is stirred and thoroughly admixed a suitable metallic oxide, preferably, in this instance, lead oxide, until a stiff paste, free from lumps and particles of dry oxide, is produced. Any quantity of this oxide paste may be made at one time, and the portion remaining unused may be left standing an indefinite period without any deteriorating effect, a little water being added when the paste becomes too dry for use to bring it to the proper consistency. The paste thus prepared is placed upon the plate or support A, which may be either a grid, in which case the apertures are filled, or, if a plain plate, the paste is spread on in an even sheet, any suitable means being employed for this purpose, as mechanical pressure, or manually by means of a wooden or a metallic spatula. The plates are now immersed while the oxide paste is still damp in an acid pickling-bath consisting in this instance of, say, sulphuric acid and water of a strength of from 15° to 25° Baumé, where they are allowed to remain two or three days or for a longer or a shorter period, the duration of treatment being governed by the amount of oxide to be acted upon. During this immersion the support and the oxide B, owing to the action of the acid thereon, become covered with a precipitate or deposit of practically insoluble sulphate of lead, which forms an inclosing film, coating, or envelope C and serves to bind the oxide firmly to the support, thus establishing the intimate union to which reference has been made. By employing a weak solution of sulphuric acid and water such as described little or no heat is generated, so that the plates or supports are not strained or buckled by any violent or sudden expansion of the oxide, which would inevitably result if a pure acid-bath or a very strong acid solution were employed. The plates, having remained in the pickling-bath the required time, are removed, and are either perfectly dried or only to a degree sufficient to admit of their being handled without danger of the acid eating the hands of the operator or of destroying the clothing, and a number sufficient to form a complete battery are then immersed in a suitable acid-bath connecting with a source of electricity and are formed in the usual manner.

By the initial pickling process just described the oxide is caused to undergo practically all the expansion possible, and as the expansion is gradual, owing to the weakness of the solution in which it is immersed and the length of time it is left therein, any tendency to subsequent disintegration is prevented. Thus when the final step is taken—namely, when the electrode is formed—the violent chemical and electrical action to which it is then subjected does not cause any further expansion of the oxide, so that its position on the support remains unchanged. Furthermore, the initial pickling renders the oxide to a marked degree susceptible to electrical influence when being formed, so that much less time is required for this latter step than when the ordinary methods are pursued.

In practice I have mounted the plates before pasting and also after pasting and before pickling. I have also formed the plates in the same solution in which they were pickled, and sometimes without removing them therefrom; but I prefer, as a matter of economy, first to paste, then to pickle, and, finally, to mount and form them. The oxide treated in this manner possesses three very great advantages: first, it is firm and porous both before and after being formed; secondly, it is firmly attached to the plate or support by the envelope or film of sulphate of lead, and, thirdly, it offers but slight resistance to the battery action while being formed.

I have described the use of oxide of lead alone in this process; but it is to be understood that I may employ minium for the positive plate and litharge for the negative plate, or I may, if desired, use these alternately, or they may be mixed together, or one alone may be used on both the positive and the negative plates.

Having thus fully described my invention, what I claim as new, and desire to secure by Letters Patent, is—

1. The process of initially preparing secondary-battery plates, which consists in mixing a suitable metallic oxide with water, placing the resulting paste on a suitable support, and then pickling the whole in an acid solution.

2. The process of making secondary-battery plates, which consists in mixing a suitable metallic oxide with water, placing the resulting paste on a suitable support, pickling the whole in an acid solution, and then forming.

3. The process of making secondary-battery plates, which consists in mixing an oxide of lead with water, placing the resulting paste on a suitable support, pickling the whole in a solution of sulphuric acid and water, and then forming.

4. The process of making secondary-battery plates, which consists in mixing an oxide of lead with water, placing the resulting paste on a suitable support, pickling the whole in a solution of sulphuric acid of from 15° to 25° Baumé, and then forming.

5. The process of making secondary-battery plates, which consists in mixing an oxide of lead with water, placing the resulting paste on a suitable support, pickling the whole in an acid solution, and then forming in the pickling solution.

6. The process of intimately uniting the active material with the supporting-plate of a secondary battery, which consists in mixing a suitable metallic oxide with water, placing the resulting paste on a suitable metallic support, and then pickling the whole in an acid solution until an envelope of a combination of the oxide and the metal of the support with the acid is produced.

7. The process of chemically uniting the active material with the supporting-plate of a secondary battery, which consists in mixing an oxide of lead with water, placing the resulting paste on a suitable metallic support, and then pickling the whole in an acid solution until an envelope of a sulphate of the oxide and the metal of the support is produced.

In testimony whereof I affix my signature in presence of two witnesses.

WILLIAM L. SILVEY.

Witnesses:
C. U. RAYMOND,
JOHN KIRBY, Jr.